Patented Sept. 6, 1938

2,129,052

UNITED STATES PATENT OFFICE 2,129,052

HYDROLYZED CELLULOSE ACETATE

Charles R. Fordyce, Rochester, N. Y., assignor, by mesne assignments, to Eastman Kodak Company, Jersey City, N. J., a corporation of New Jersey No Drawing. Application February 4, 1936, Serial No. 62,333

8 Claims. (Cl. 260—102)

The present invention relates to cellulose acetate which has been hydrolyzed to an acetyl content of 13 to 28% and the products prepared therefrom. Those acetates having an acetyl content within the range of 13 to 24% are characterized by their susceptibility to water, those above 19% being insoluble in water while those below 19% exhibit water solubility.

In the preparation of cellulose acetate, cellulose is substantially fully esterified by treating it with a mixture comprising acetic anhydride and an acylation catalyst usually in the presence of a diluting liquid such as acetic acid. The product of this reaction, while still in solution in the reaction mixture, is then hydrolyzed by the addition of dilute acetic acid thereto, with or without further catalyst, to render it acetone-soluble. The fully acetylated cellulose has an acetyl content of approximately 44% which upon hydrolysis to acetone-solubility is reduced to approximately 38–41%.

The production of cellulose acetate of 38–41% directly by incompletely acetylating the cellulose, rather than by completely acetylating and then hydrolyzing, has been proposed but the product of that process is not uniform and is unsuitable for commercial use. It has also been pointed out in the prior art that cellulose acetate which has been hydrolyzed by an aqueous alkali is not uniform and homogeneous.

If a cellulose acetate having a lower acetyl content than that of the ordinary commercial acetone-soluble sort is desired the hydrolysis step may be prolonged so that an acetate having an acetyl content as low as 33% is obtained. When the hydrolysis is continued much beyond this point such as down to approximately 30% the acetate becomes insoluble in the hydrolysis bath and gelling or solidification occurs.

This gelling may be avoided by hydrolyzing under severe conditions such as a high temperature or a high concentration of catalyst, but this causes degradation of the cellulose and the resulting products are not useful commercially because of their low strength and brittleness.

That prolonged hydrolysis of cellulose acetate will lower the acetyl even below acetone-solubility, has been recognized; however, at least in the case of the acid hydrolysis of cellulose acetate, the acetyl content has never been reduced below approximately 30% or to a point where gelling occurred. As a general rule, if the hydrolysis is carried beyond the point of acetone-solubility it is an inadvertence and the product is reacetylated to bring it back to acetone-solubility as shown for instance in Clarke and Malm Patent No. 1,668,946.

I have found that cellulose acetate which has been hydrolyzed to an acetyl content of 13 to 28% exhibits characteristics which are valuable commercially. For instance, cellulose acetate having an acetyl content of 13 to 19% is water soluble and is useful for water soluble films or coatings such an antihalation backings for photographic films or water soluble paper coatings. These cellulose esters are also good emulsifying agents for oils such as benzene or paraffin oil. The esters having an acetyl content of 19 to 24% while not water soluble are water susceptible and are useful where highly water susceptible transparent compositions are desirable, such as a carrier for light-sensitive photographic materials. The cellulose acetates having a range of 24 to 28% are insoluble in the common solvents for cellulose esters such as acetone or ethylene chloride-alcohol but are soluble in ethylene glycol mono-methyl ether. These esters may be employed for preparing film or sheeting which may later be subjected to conditions in which the more common solvents are present.

To prepare these esters the hydrolysis bath must have an aggregate water content greater than that which is usually employed in hydrolyzing cellulose acetate. The minimum aggregate water content which can be employed to hydrolyze cellulose acetate to the 24 to 28% range is 15% while for the 19 to 24% range, the minimum aggregate water content will be approximately 20%. Obviously, the lower the acetyl content desired, the higher will be the minimum aggregate water content. For the cellulose acetate within the range of 13 to 19% acetyl, the minimum aggregate water content will be 25 to 30%. Where the aggregate water content of the hydrolysis bath is 15% or near that figure, the water may be supplied to the bath initially. This is usually done by adding dilute acetic acid thereto. However, with proportions very much greater than 15%, it is necessary that the aggregate water content be added at intervals during the hydrolysis. The hydrolysis of cellulose acetate with a high percentage of water is described in U. S. Patent No. 2,013,830.

The hydrolysis may be carried out by adding dilute acetic acid either with or without further mineral catalyst to the finished esterification mixture and maintaining it at a hydrolyzing temperature, such as 100° F., for a sufficient time to obtain a cellulose ester having the acetyl content desired. As pointed out above, it is preferable and as a general rule necessary to add further dilute acid during the course of the hydrolysis to reduce the ester to the desired acetyl content without gelling occurring in the hydrolysis bath. As the hydrolysis proceeds, the ester present therein becomes susceptible to a greater content of water in the hydrolysis mixture. If preferred, the products of the present invention may be prepared by dissolving cellulose acetate which has been isolated from its reaction mixture in dilute acetic acid, the concentration depending upon the acetyl content of the cellulose acetate. The dilute acetic acid may contain a sulfuric acid catalyst or, if the catalyst is omitted, the hydrolysis may be carried out at an elevated temperature such as 90 to 100° C. For example, a cellulose acetate having an acetyl content of 30 to 40% may be dissolved in 50 to 60% acetic acid containing sulfuric acid catalyst and the whole maintained at 100° F. until the desired product is obtained. The following examples are illustrative of the preparation of cellulose acetates of our invention:

*Example I*

100 parts of cellulose acetate having an acetyl content of 33% was dissolved in 1000 parts of 60% acetic acid containing 2 parts by weight of sulfuric acid. The ester was hydrolyzed by maintaining the solution at 100° F. for 120 hours. It was then precipitated by pouring into a large volume of water, and the ester was washed and dried. The product contained 21% acetyl. It was insoluble in ethylene glycol mono-methyl ether and in water but was soluble in a mixture of equal volumes of these liquids.

*Example II*

A solution of a cellulose acetate containing 33% acetyl was prepared as in the preceding example. The ester was hydrolyzed by maintaining the solution at 100° F. for 192 hours. It was then precipitated in methyl alcohol and extracted with alcohol until free from acetic acid. It was then washed with acetone to remove the alcohol and dried. The product contained 14% acetyl. It dissolved in water to give clear, viscous solutions. Upon flowing out the solution upon a film forming surface and evaporating off the water, transparent water soluble films are obtained.

*Example III*

To a solution of cellulose acetate in its reaction mixture as prepared from cotton linters was added enough 50% acetic acid to destroy the excess acetic anhydride present and to produce a bath comprising approximately 90% of acetic acid and 10% of water. The mixture was then held at 100° F. until a test sample showed that the acetate was no longer soluble in acetone. Enough 30% acetic acid was then added to raise the water content of the solution to approximately 40% and the hydrolysis was continued until a test sample, precipitated with methyl alcohol, would dissolve in water to give a clear viscous solution. The ester was then precipitated, extracted, washed and dried by the same procedure employed in this connection in Example II.

Besides cellulose acetate having an acetyl content of 13 to 28% this process also concerns other cellulose esters, such as cellulose acetate propionate and cellulose acetate butyrate, the acyl content of which is predominately acetyl, and which has been hydrolyzed to a total acyl content of 13 to 28%.

As pointed out above, the products of the present invention have been found to be useful in a number of different connections and their characteristics offer a possibility of numerous uses. For instance, the cellulose acetates having an acetyl content of 19 to 24% or even 26% are eminently suitable for use as a carrier for the light-sensitive substances employed in the preparation of photographic film, for instance, the light-sensitive silver salts used in that connection. Due to the fact that these esters are susceptible to penetration by water, they make possible the processing of the film by the ordinary developing and fixing baths. The use of these esters as the carrier of the light-sensitive substances in photographic film is the invention of Martti Salo and will be described in more detail and claimed in an application filed in his name.

Hydrolyzed cellulose acetates having acetyl contents of 13 to 19% are suitable for use as the stripping layer numbered two described in U. S. Patent No. 1,973,476 of Fordyce and Salo. The cellulose acetate having an acetyl content of 19 to 24% may be employed as the layer numbered three which is described in that patent.

The water soluble cellulose acetates which have an acetyl content of 13 to 19% are also good emulsifying agents. For instance, a dilute water solution of such a cellulose acetate will emulsify oils giving uniform emulsions which will stand for a considerable period of time at room temperature without separating into two layers. Being chemically neutral, they may be more widely used as emulsifying agents with water than soaps. The hydrolyzed cellulose acetates of the present invention may be listed as follows:

1. Acetyl content of 24 to 28%, insoluble in acetone, water, and mixtures of ethylene chloride-methyl alcohol, but soluble in ethylene glycol-mono-methyl ether.
2. Acetyl content of 19 to 24%, insoluble in acetone, water, ethylene glycol-monomethyl ether, and mixtures of ethylene chloride and methyl alcohol but soluble in mixtures of ethylene glycol mono-methyl ether and water (1:1).
3. Acetyl content of 13 to 19%, soluble in water.

As may be learned from the above description, the solubility of these hydrolyzed cellulose acetates having low acetyl content varies even within the ranges above outlined. For instance, a cellulose acetate having an acetyl content from 13 to 25% is soluble in a mixture of 4 parts of water with 1 part of dioxan, while a cellulose acetate having an acetyl content of 28% is only soluble in mixtures of water and dioxan containing more than 30% of the latter.

A cellulose acetate having an acetyl content of 26% is soluble in acetone and water mixtures containing from 30% up to 80% of acetone while a cellulose acetate having an acetyl content of 18% is soluble in water and in aqueous acetone having not over 40% acetone.

A cellulose acetate having an acetyl content of 20% is soluble in ethylene glycol mono-methyl ether-water mixtures in which the former component is present in a proportion of 25 to 80% of the solvent. In the case of a cellulose acetate of 26% acetyl content, there must be present at least more than 55% of ethylene glycol mono-methyl ether to dissolve that ester, while an acetate having an acetyl content of 16% will tolerate not more than 15% of ethylene glycol mono-methyl ether. Thus it may be seen that the lower the acetyl content of the ester in the range from 13 to 24% acetyl, the greater the solubility thereof in an aqueous solvent as the water content of that solvent is increased.

To determine the value of the hydrolyzed cellulose acetate in the range of acetyl content from 19% to 24% as a carrier for light-sensitive materials, the rate of penetration of photographic developer through hydrolyzed cellulose acetate having different acetyl contents was determined. In cellulose acetates having an acetyl content of 30 to 36%, twenty-one minutes were required to penetrate film made therefrom. On the other hand cellulose acetate having an acetyl content of 19 to 24% required only four minutes for the 24% acetyl cellulose acetate down to less than two minutes for the 19% acetyl content acetate.

As pointed out above, the cellulose acetates having an acetyl content of 24 to 28% may be formed into film to be employed where that film is exposed to liquids such as acetone and ethylene chloride-alcohol which are solvents for the ordinarily employed cellulose acetates. A film of a cellulose acetate having 24 to 28% acetyl content may be over-coated with an acetone solution of a cellulose derivative without itself being affected either by dissolution or distortion. If desired later, this layer of cellulose derivative may be removed without injury to the acetate having the 24 to 28% acetyl content. There are numerous uses which may be made of water soluble cellulose esters and, heretofore, it has been thought necessary to have present other groups such as lactyl in order to attain water solubility. The water soluble products of the present invention may be prepared from ordinary commercial cellulose acetate without the necessity of introducing any other acyl group thereto.

I claim as my invention:

1. A cellulose organic acid ester containing acyl groups of 2-4 carbon atoms in which the acetyl groups predominate, resulting from hydrolyzing a cellulose organic acid ester having a high acyl content under non-degrading conditions, employing about two parts of sulfuric acid per 100 parts of cellulose ester, until its total acyl content is between 28%-13%.

2. A cellulose acetate resulting from hydrolyzing a cellulose ester having a high acetyl content under non-degrading conditions, employing about two parts of sulfuric acid per 100 parts of cellulose ester, until its total acyl content is between 28%-13%.

3. A water-soluble cellulose acetate resulting from hydrolyzing a cellulose ester having a high acetyl content under non-degrading conditions, employing about two parts of sulfuric acid per 100 parts of cellulose ester, until the total acyl content is between 19%-13%.

4. A water-permeable cellulose acetate resulting from hydrolyzing a cellulose ester having a high acetyl content under non-degrading conditions, employing about two parts of sulfuric acid per 100 parts of cellulose ester, until the total acyl content is between 24%-19%.

5. A process for making a water-susceptible cellulose ester containing acyl groups of 2-4 carbon atoms, the acetyl groups predominating, which comprises hydrolyzing the cellulose ester having a high acyl content under non-degrading conditions, employing about two parts of sulfuric acid per 100 parts of cellulose ester, while in solution in an acetic acid hydrolyzing bath having an aggregate water content of at least 15% until a total acyl content of not more than 28% is reached.

6. A process for making a water-soluble cellulose ester containing acyl groups of 2-4 carbon atoms, the acetyl groups predominating, which comprises hydrolyzing a cellulose ester having a high acyl content under non-degrading conditions, employing about two parts of sulfuric acid per 100 parts of cellulose ester, while in solution in an acetic acid hydrolyzing bath having an aggregate water content of 25%-30% until a total acyl content of 19%-13% is reached.

7. A process for making a water-susceptible cellulose ester containing acyl groups of 2-4 carbon atoms, the acetyl groups predominating, which comprises adding sufficient dilute acetic acid to destroy the lower fatty acid anhydride present in a reaction mixture containing the cellulose ester having a high acyl content in solution and then hydrolyzing the ester under non-degrading conditions, employing two parts of sulfuric acid per 100 parts of cellulose ester, in an acetic acid hydrolyzing bath having an aggregate water content of at least 15% until a total acyl content of less than 28% is reached.

8. A process for making a water-soluble cellulose acetate which comprises adding sufficient 50% aqueous acetic acid to a completed cellulose acetate reaction mass to destroy the excess acetic anhydride present and to produce a bath comprising approximately 90% acetic acid and 10% of water, hydrolyzing the cellulose acetate under non-degrading conditions, employing about two parts of sulfuric acid per 100 parts of cellulose ester, to a point short of insolubility of the acetate in the bath and then adding sufficient 30% aqueous acetic acid to raise the water content to approximately 40% and continuing hydrolysis under non-degrading conditions until a total acyl content of 19%-13% is reached.

CHARLES R. FORDYCE.